United States Patent
Breitfuss et al.

(10) Patent No.: US 7,994,659 B2
(45) Date of Patent: Aug. 9, 2011

(54) METHOD FOR SUPPLYING ELECTRICAL ENERGY FROM A FIRST ELECTRONIC CIRCUIT TO A SECOND ELECTRONIC CIRCUIT VIA AT LEAST ONE WIRE LINE

(75) Inventors: Klemens Breitfuss, Voitsberg (AT); Markus Harnisch, Graz (AT)

(73) Assignee: NXP B.V., Eindhoven (NL)

( * ) Notice: Subject to any disclaimer, the term of this patent is extended or adjusted under 35 U.S.C. 154(b) by 202 days.

(21) Appl. No.: 12/440,453

(22) PCT Filed: Aug. 3, 2007

(86) PCT No.: PCT/IB2007/053060
§ 371 (c)(1),
(2), (4) Date: Mar. 6, 2009

(87) PCT Pub. No.: WO2008/029312
PCT Pub. Date: Mar. 13, 2008

(65) Prior Publication Data
US 2009/0261662 A1    Oct. 22, 2009

(30) Foreign Application Priority Data
Sep. 6, 2006 (EP) .................................. 06120197

(51) Int. Cl.
*G05F 3/06* (2006.01)
(52) U.S. Cl. ........................................................ 307/151
(58) Field of Classification Search ................... 307/151
See application file for complete search history.

(56) References Cited

U.S. PATENT DOCUMENTS

| | | | |
|---|---|---|---|
| 4,079,203 A * | 3/1978 | Dragoo | 370/204 |
| 4,218,770 A * | 8/1980 | Weller | 375/360 |
| 7,400,253 B2 * | 7/2008 | Cohen | 340/572.1 |
| 2005/0035430 A1 | 2/2005 | Beigel | |
| 2005/0225437 A1 | 10/2005 | Shiotsu et al. | |

FOREIGN PATENT DOCUMENTS

| | | |
|---|---|---|
| DE | 10229459 C1 | 11/2003 |
| EP | 1026832 A | 8/2000 |
| WO | 9930401 A | 6/1999 |
| WO | 2004095350 | 4/2004 |
| WO | 2006018231 A1 | 2/2006 |
| WO | 2006028195 | 3/2006 |
| WO | 2006003648 | 12/2006 |

OTHER PUBLICATIONS

Inoue, S., et al; "Systematic Error Detection for RFID Reliability"; The First International Conference on Availability, Reliability and Security; 2006; ARES 2006; p. 280-286; Apr. 20-22, 2006.

* cited by examiner

*Primary Examiner* — Robert L. Deberadinis

(57) ABSTRACT

A method of supplying electrical energy from a first electronic circuit (10) to a second electronic circuit (20) connected via a communication interface (30), which interface (30) comprises at least one wire line (31) within a Radio Frequency Identification communication device (1), the method comprising the steps of: providing a coded high frequency data signal (S1) in the first electronic circuit (10); transmitting said coded high frequency data signal (S1) containing data and clock information via said communication interface (30) from said first electronic circuit (10) to said second electronic circuit (20); rectifying the transmitted coded high frequency data signal (S1) via rectifier means (21) in said second electronic circuit (20) to provide a rectified power signal (RS); and supplying the electrical energy contained in the rectified power signal (RS) to the second electronic circuit (20).

15 Claims, 1 Drawing Sheet

METHOD FOR SUPPLYING ELECTRICAL ENERGY FROM A FIRST ELECTRONIC CIRCUIT TO A SECOND ELECTRONIC CIRCUIT VIA AT LEAST ONE WIRE LINE

FIELD OF THE INVENTION

The invention relates to a method of supplying electrical energy from a first electronic circuit to a second electronic circuit via at least one wire line of a communication interface.

The invention further relates to a communication device.

BACKGROUND OF THE INVENTION

Contactless identification systems or so-called radio frequency identification (RFID) systems are gaining more and more importance particularly in the field of logistics, commerce and industrial production. Thus, contactless identification systems or RFID systems are implemented in these fields. Further applications of identification systems are related to the identification of food, persons and animals. In addition, the upcoming technology of Near Field Communication (NFC), also applies to the same technical field.

In particular, such systems are suitable for wireless data transmission in a fast manner without cable connections and comprise at least one reader/writer device referred to as base station and one or more communication devices referred to as transponder. Different types of transponders are known from the art, in particular depending on their energy supply. Some of said transponders do not have their own power supply and are therefore called passive transponders. Passive transponders take the electrical energy required for their own power supply from an electromagnetic field provided by the at least one base station. To this end, the transponder has to be moved into the electromagnetic field of the base station.

For data transmission a communication device is inductively coupled to said reader/writer device and comprises at least a first electronic circuit, usually a microchip connected to a large area coil that functions as an antenna. The first electronic circuit may be connected via an internal communication interface to a second electronic circuit, for example a Smart Card like a Subscriber Identity Module (SIM) module or something similar for an exchange of data between said first and second electronic circuits. If the communication device is moved into the electromagnetic field provided by the reader/writer device, a current is induced in the large area coil and the first electronic circuit is powered up.

In the technical field of Near Field Communication (NFC) the European Computer Manufacturers Association (ECMA) has standardized a communication interface referred to as Near Field Communication Wired Interface (NFC-WI), which specifies a digital wire interface between said first electronic circuit connected to the antenna and the second electronic circuit of said communication device. The first electronic circuit may be a front-end device that drives a first high frequency signal via Signal-Out data line and receives a second high frequency signal via a Signal-In data line of the communication interface. The second electronic circuit may be a transceiver unit that drives said second high frequency signal via said Signal-In data line and receives said first high frequency signal via said Signal-Out data line of the communication interface. NFC-WI specifies the timing and signal requirements of the Signal-In and Signal-Out data lines as well as the handshaking between the first and second electronic circuit via the communication interface.

The electrical energy required for the power supply of the first electronic circuit is taken from the electromagnetic field provided by the reader/writer device, whereas the second electronic circuit may be powered by the first electronic circuit via a accumulator unit or via additional wire lines of the communication interface. Particularly in the case of the second electronic circuit being realized as a SIM card having a 7816-interface comprising eight ports for wire lines, only two single inputs ports for wire lines are left for the implementation of said communication interface. However, for the implementation of said communication interface, said first and second data signal as well as a clock signal have to be transmitted. Additional wire lines for the power supply of the SIM card are needed if the power is supplied by the first electronic circuit.

A two-wire communication interface capable of supplying electrical power to an electrical circuit via at least one wire line is well known in the art referred to as $4/20$ mA interface. In contactless RFID communication systems however, the energy taken from the electromagnetic field of an RFID communication system is not sufficient for driving such a $4/20$ mA interface. Moreover, the current consumption of said $4/20$ mA interface is too high to be driven by an accumulator unit and is therefore not suited for an application in contactless RFID communication systems.

OBJECT AND SUMMARY OF THE INVENTION

It is an object of the invention to provide a method of supplying electrical energy from a first electronic circuit to a second electronic circuit via at least one wire line of a communication interface within a wireless communication device, overcoming the technical drawbacks mentioned above.

In order to achieve the object defined above, a method according to the invention can be characterized in the way defined below, that is:

A method of supplying electrical energy from a first electronic circuit to a second electronic circuit connected via a communication interface, the interface comprising at least one wire line within a wireless communication device, the method comprising the steps of:

providing a coded high frequency data signal in the first electronic circuit;

transmitting said coded high frequency data signal containing data, clock information and electrical energy via said communication interface from said first electronic circuit to said second electronic circuit;

rectifying the transmitted coded high frequency data signal via rectifier means in said second electronic circuit to provide a rectified power signal; and supplying the electrical energy contained in the rectified power signal to the second electronic circuit.

In this way, a method of supplying electrical energy to an electronic circuit, e.g. a SIM card of a contactless RFID communication device is proposed, wherein data, clock information and electrical energy are derived from a coded high frequency data signal transmitted via a single wire line of a communication interface. Said coded high frequency data signal is transmitted to the second electronic circuit, e.g. a SIM card as soon as the contactless RFID communication device enters an electromagnetic field of a reader/writer device. Hence, one single wire line is advantageously used to transmit data, clock information and electric power simultaneously from the first electrical circuit to said SIM card. For example, in the case an external accumulator is provided in the second electronic circuit, e.g. a SIM card and said accumulator fails, the power supply of the SIM card via the communication interface by the first electronic circuit is still assured. Also in the case where the SIM card is not powered by an external accumulator unit, data stored on the SIM card can be read from the SIM card as soon as said RFID communication device comprising said SIM card enters the electromagnetic field of a reader/writer device of an RFID system.

Further, advantageously said rectified power signal is used to power energy storage means in the second electronic circuit, whereas the energy storage means may be realized as a storage capacitor.

According to another aspect of the inventive method, a clock signal is derived from the clock information transmitted coded high frequency data signal in the second electronic circuit. Alternatively, said clock signal is derived via a Phase Locked Loop (PLL) circuit provided in the second electronic circuit.

In a further advantageous aspect of the inventive method, the data contained in said coded high frequency data signal is encoded according to the modified Miller Coding scheme. The modified Miller Coding scheme has very short pulses resulting in a nearly continuous power supply of the second electrical circuit via said rectified power signal.

The object of the invention is furthermore achieved by a communication device comprising a first electronic circuit and a second electronic circuit being connected via a communication interface comprising at least one wire line, wherein
  the first electronic circuit comprising control means for providing a coded high frequency data signal containing data and clock information,
  the second electronic circuit comprising rectifier means for rectifying said high frequency data signal in said second electronic circuit after transmission via said communication interface to provide a rectified power signal; wherein the electrical energy of the rectified power signal is used to power the second electronic circuit.

Advantageously, said second electronic circuit comprises energy storage means for storing the electrical energy contained in the rectified power signal and the rectifier means may be realized as a rectifying circuit comprising four rectifying diodes.

Further, advantageously the control means are capable of encoding the data which are transmitted via said coded high frequency data signal according to the modified Miller Coding scheme and the first electronic circuit comprises at least an amplifier unit for adjusting the energy level of the coded high frequency data signal before transmission via the communication interface.

The aspects defined above and further aspects of the invention are apparent from the examples of embodiment to be described hereinafter and are explained with reference to these examples of embodiment.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
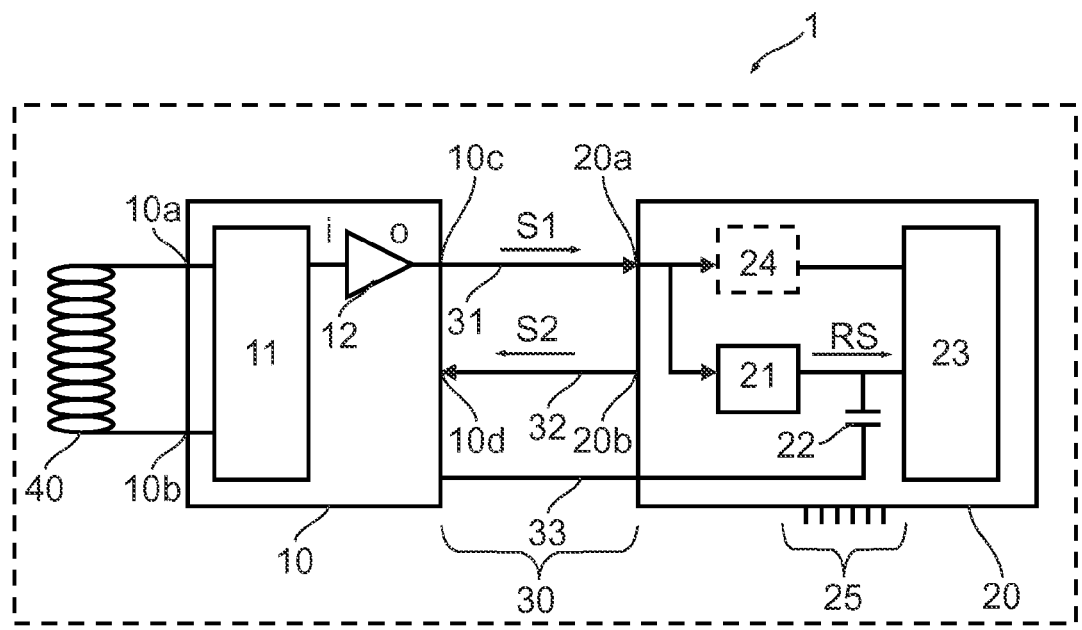
FIG. 1 shows a block diagram of an RFID communication device.

FIG. 1 shows by way of example in a block diagram a communication device 1, in particular a Radio Frequency Identification (RFID) or Near Field Communication (NFC) device 1 comprising a first electronic circuit 10 and a second electronic circuit 20. The first electronic circuit 10 is connected to said second electronic circuit 20 via a communication interface 30 comprising a first wire line 31 and a second wire line 32 as well as a ground potential line 33. Via said first wire line 31, a first coded high frequency data signal S1 is transmitted from the first electronic circuit 10 to the second electronic circuit. Via said second wire line 32 a second coded high frequency data signal S2 is transmitted from the second electronic circuit 20 to the first electronic circuit 10. The data contained in said first and second coded high frequency signal S1, S2 is coded according to a digital coding scheme. The ground potential line 33 is attached to the first and second electronic circuits 10, 20 and forms a reference or ground potential.

The first electronic circuit 10 is capable of receiving and/or transmitting data via a wireless air interface from and/or to a reader/writer device (not shown in FIG. 1). Via said reader/writer device an electromagnetic field is provided both for wireless data communication between the reader/writer device and the communication device 1 and for energizing the communication device 1 in the case where the communication device 1 is configured as a passive device.

The first electronic circuit 10 is connected via a first and a second analog port 10a, 10b to an antenna 40 for receiving and transmitting at least one electromagnetic wave signal provided by the reader/writer device. Said electromagnetic wave signal may have a frequency of 13.56 MHz for instance.

The antenna 40 receives the electromagnetic wave signal from the reader/writer device and passes it to a control module 11 attached to the first and second analog port 10a, 10b. In general, the control module 11 derives from the received electromagnetic wave signal the electrical energy needed to power the first electronic circuit 10 and restores the data contained in the electromagnetic wave signal. In addition to that, the data exchange via said communication interface 30 between the first and second electronic circuits 10, 20 is controlled by said control module 11. The first coded high frequency data signal S1 is provided by the control module 11.

The control module 11 is further connected to an input i of at least one amplifier unit 12 for amplifying the first coded high frequency data signal S1. The first wire line 31 of the communication interface 30 is attached to a digital output port 10c of the first electronic circuit 10, which is connected to the output o of the at least one amplifier unit 12. In addition to that, the first electronic circuit 10 comprises a digital input port 10d connected to the second wire line 32 of the communication interface 30, where the transmitted second coded high frequency data signal S2 is received in the first electronic circuit 10.

The first wire line 31 of the communication interface 30 is further connected to a digital input port 20a of the second electronic circuit 20 and the second wire line 32 is further connected to a digital output port 20b of the second electronic circuit 20, whereas the digital input port 20a is attached to rectifier means 22. In a preferred embodiment, the rectifier means 21 may be realized as a rectifying circuit comprising four rectifying diodes (not shown in FIG. 1). Two of the rectifying diodes are connected to said reference or ground potential, whereas the other two rectifying diodes are connected together and form the energy supply of the second electronic circuit 20.

The rectifier means 21 are connected to energy storage means 22. In a preferred embodiment, the storage means 22 are formed by a storage capacitor, wherein the electrical energy provided via said communication interface 30 from the first electronic circuit 10 to the second electronic circuit 20 is stored. The storage capacitor is attached to the first wire line 31 as well as to the ground potential line 33. The rectifier means 21 and the energy storage means 22 are connected to a control module 23 of the second electronic circuit 20.

After amplification, the first high frequency data signal S1 is transmitted from the first electronic circuit 10 via said communication interface 30 to the second electronic circuit 20. The first coded high frequency data signal S1 provided by the first electronic circuit 10 contains, besides the data to be transmitted, clock information as well as electrical energy. In other words: via said first coded high frequency data signal S1 in addition to coded data, clock information and electrical energy is transmitted simultaneously via the single wire line 31 from said first electronic circuit 10 to said second electronic circuit 20 resulting in a reduced number of wire lines needed for the data exchange via said communication interface 30.

Figure 2:
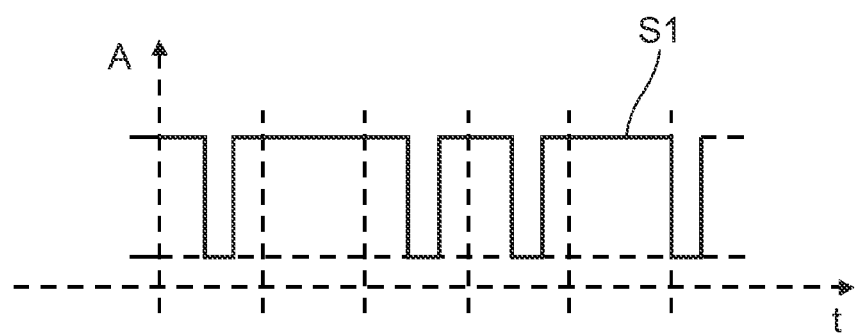
FIG. 2 shows a diagram of an encoded high frequency data signal.

FIG. 2 shows a diagram illustrating a signal amplitude A of said first encoded high frequency data signal S1, plotted against time t. The data contained in said transmitted first high frequency signal S1 is coded according to a digital coding scheme. The clock frequency of the high frequency signal S1 may be 13.56 MHz for instance and a modified Miller Coding Scheme may be applied as a digital coding scheme. The encoding of the data according to the digital coding scheme used results in a sequence of transitions from a logical High to a logical Low or vice versa in varying intervals, representing the different symbols of the coding schemes used.

Said first encoded high frequency data signal S1 is rectified via said rectifier means 21 that produce a rectified power signal RS, which is applied to said storage means 22. The electrical energy contained in said rectified power signal RS is first stored in said storage means 22. The storage means 22 take over the power supply of the second electronic circuit 20, especially in the case of a signal pause according to the coding scheme used of the first encoded high frequency data signal S1.

After reception of the first high frequency signal S1 in the second electronic circuit 20, the first high frequency signal S1 is forwarded to the control module 23, wherein a clock signal is derived from the transmitted first high frequency signal S1 in order to be sent to the control module 23. Additionally, the data contained in said transmitted first coded high frequency signal S1 is decoded, which means deriving a data signal from the transmitted first high frequency signal S1 in the control module 23 of the second electronic circuit 20.

In a preferred embodiment, a Phase Locked Loop (PLL) circuit 24 may be arranged between the digital input port 20a and the control module 23 in the second electronic circuit 20, to restore a stable clock signal based on the clock information contained in the first encoded high frequency signal S1.

By way of example, the data exchange between the first electronic circuit 10 and the second electronic circuit 20 via said communication interface 30 may be implemented according to the standardized Near Field Communication Wired Interface (NFC-WI) and the second electronic circuit 20 may be formed by a Subscriber Identity Module (SIM) comprising an ISO 7816 interface 25, wherein the digital input and output ports 20a, 20b may be ports of said ISO 7816 interface 25. Said SIM module may offer a secure emulated contactless card functionality.

Therefore, said SIM module may contain high security processors that function as a secure storage means of data like card holder data (for instance name, account numbers, etc.). Access to these data may be made possible only when the card is inserted into a read/write terminal within the communication device 1.

The communication device 1 may be designed for a communication with a read/write device according to ISO 15693 or ISO 14443.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of supplying electrical energy from a first electronic circuit to a second electronic circuit, the first electronic circuit and the second electronic circuit connected via a communication interface, the interface comprising at least one wire line within a wireless communication device, the method comprising:
   deriving, in the first electronic circuit, from a received electromagnetic wave signal the electrical energy needed to power the first electronic circuit;
   providing a coded high frequency data signal in the first electronic circuit;
   transmitting said coded high frequency data signal comprising data and clock information via a single wire line of said communication interface from said first electronic circuit to said second electronic circuit;
   rectifying the transmitted coded high frequency data signal via rectifier means in said second electronic circuit to provide a rectified power signal; and
   supplying the electrical energy contained in the rectified power signal to the second electronic circuit.

2. A method according to claim 1, comprising:
   applying the rectified power signal to energy storage means in the second electronic circuit.

3. A method according to claim 1, comprising:
   deriving a clock signal from the clock information contained in the transmitted coded high frequency data signal in the second electronic circuit.

4. A method according to claim 1, comprising:
   deriving a clock signal from the clock information contained in the transmitted coded high frequency data signal via a Phase Locked Loop circuit provided in the second electronic circuit.

5. A method according to claim 1:
   restoring the data contained in the transmitted coded high frequency data signal in the second electronic circuit.

6. A method according to claim 1, wherein the data contained in the coded high frequency data signal is encoded according to the modified Miller Coding scheme.

7. A method according to claim 1, comprising:
   adjusting the energy level contained in the coded high frequency data signal via at least one amplifier unit in the first electronic circuit.

8. Communication device comprising a first electronic circuit and a second electronic circuit connected via a communication interface comprising at least one wire line, wherein the first electronic circuit comprises control means for deriving from a received electromagnetic wave signal the electrical energy needed to power the first electronic circuit and providing a coded high frequency data signal containing data and clock information, the second electronic circuit comprises rectifier means for rectifying said high frequency data signal in said second electronic circuit after transmission via a single wire line of said communication interface to provide a rectified power signal; and wherein the electrical energy of the rectified power signal is used to power the second electronic circuit.

9. Communication device according to claim 8, wherein said second electronic circuit comprises energy storage means for storing the electrical energy contained in the rectified power signal.

10. Communication device according to claim 8, wherein the communication device is designed for a Radio Frequency Identification system.

11. Communication device according to claim 8, wherein the rectifier means may be realized as a rectifying circuit comprising rectifying diodes.

12. Communication device according to claim 8, wherein the control means are capable of encoding the data being transmitted via said coded high frequency data signal according to the modified Miller Coding scheme.

13. Communication device according to claim 8, wherein the first electronic circuit is connected via a first and second analog port to an antenna for receiving and/or transmitting at least one electromagnetic wave signal.

14. Communication device according to claim 8, wherein the first electronic circuit comprises at least an amplifier unit for adjusting the energy level of the coded high frequency data signal before transmission via the communication interface.

15. Communication device according to claim 8, wherein the second electronic circuit comprises a Phase Locked Loop circuit for deriving a clock signal from the clock information contained in the transmitted coded high frequency data signal.

* * * * *